United States Patent
Wu et al.

(10) Patent No.: US 11,363,023 B2
(45) Date of Patent: *Jun. 14, 2022

(54) METHOD, DEVICE AND SYSTEM FOR OBTAINING LOCAL DOMAIN NAME

(71) Applicant: Huawei Technologies Co., Ltd., Shenzhen (CN)

(72) Inventors: Qin Wu, Nanjing (CN); Yungui Wang, Nanjing (CN); Jinwei Xia, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 90 days.

This patent is subject to a terminal disclaimer.

(21) Appl. No.: 16/803,698

(22) Filed: Feb. 27, 2020

(65) Prior Publication Data

US 2020/0195646 A1 Jun. 18, 2020

Related U.S. Application Data

(63) Continuation of application No. 15/428,335, filed on Feb. 9, 2017, now Pat. No. 10,601,830, which is a (Continued)

(51) Int. Cl.
*G06F 21/00* (2013.01)
*H04L 9/40* (2022.01)
(Continued)

(52) U.S. Cl.
CPC ...... *H04L 63/0892* (2013.01); *H04L 61/2015* (2013.01); *H04L 63/10* (2013.01);
(Continued)

(58) Field of Classification Search
None
See application file for complete search history.

(56) References Cited

U.S. PATENT DOCUMENTS 6,288,716 B1  9/2001  Humpleman et al.
6,614,774 B1  9/2003  Wang
(Continued)

FOREIGN PATENT DOCUMENTS

CN  101136746 A  3/2008
EP    2037712 A2  3/2009
(Continued)

OTHER PUBLICATIONS

Zuniga, J.C. et al., "L3 Transport for MIH Services", IEEE 802.21 Media Independent Handover, IEEE 802.21 session, San Francisco, CA, US, Jul. 19, 2007, pp. 1-10.
(Continued)

*Primary Examiner* — Maung T Lwin
(74) *Attorney, Agent, or Firm* — Slater Matsil, LLP

(57) ABSTRACT

A method, device and system for obtaining a local domain name are provided. A Dynamic Host Configuration Protocol (DHCP) request from a User Equipment (UE) is received, in which the request carries an option for indicating returning a domain name of a local domain where the UE is located; and the domain name of the local domain where the UE is located is obtained according to the DHCP request, and the domain name of the local domain where the UE is located is carried in a DHCP reply message to be returned to the UE. A device and system for obtaining a local domain name are also provided.

16 Claims, 5 Drawing Sheets

Related U.S. Application Data continuation of application No. 13/339,943, filed on Dec. 29, 2011, now Pat. No. 9,602,463, which is a continuation of application No. PCT/CN2009/072618, filed on Jul. 3, 2009.

(51) Int. Cl.

| | | |
|---|---|---|
| *H04W 12/06* | (2021.01) | |
| *H04W 12/062* | (2021.01) | |
| *H04L 61/5014* | (2022.01) | |
| *H04L 61/4511* | (2022.01) | |
| *H04W 88/02* | (2009.01) | |
| *H04W 88/14* | (2009.01) | |

(52) U.S. Cl.
CPC ......... *H04W 12/06* (2013.01); *H04W 12/062* (2021.01); *H04L 61/1511* (2013.01); *H04W 88/02* (2013.01); *H04W 88/14* (2013.01)

(56) References Cited

U.S. PATENT DOCUMENTS

| | | | |
|---|---|---|---|
| 6,684,243 B1 | 1/2004 | Euget et al. | |
| 6,857,009 B1 | 2/2005 | Ferreria et al. | |
| 6,865,192 B1 | 3/2005 | Barrow | |
| 7,039,688 B2* | 5/2006 | Matsuda | H04L 29/12009 |
| | | | 709/203 |
| 7,096,273 B1 | 8/2006 | Meier | |
| 7,143,435 B1 | 11/2006 | Drams et al. | |
| 7,184,418 B1* | 2/2007 | Baba | H04L 43/00 |
| | | | 370/902 |
| 7,254,630 B1 | 8/2007 | Daude et al. | |
| 7,475,240 B2 | 1/2009 | Shah et al. | |
| 7,509,123 B2 | 3/2009 | O'Neill | |
| 7,523,484 B2 | 4/2009 | Lum et al. | |
| 7,729,314 B2 | 6/2010 | Siddiqi et al. | |
| 7,788,345 B1 | 8/2010 | Sukiman et al. | |
| 7,804,806 B2* | 9/2010 | Borkar | H04L 45/16 |
| | | | 370/328 |
| 8,239,549 B2 | 8/2012 | Aura et al. | |
| 8,325,626 B2* | 12/2012 | Toth | H04L 61/103 |
| | | | 370/254 |
| 8,365,018 B2 | 1/2013 | McIntosh et al. | |
| 8,489,712 B2* | 7/2013 | Kruk | H04L 29/12528 |
| | | | 709/220 |
| 9,602,463 B2 | 3/2017 | Wu et al. | |
| 2002/0007414 A1 | 1/2002 | Inoue et al. | |
| 2002/0035624 A1* | 3/2002 | Kim | H04L 61/2038 |
| | | | 709/222 |
| 2002/0057657 A1 | 5/2002 | La Porta et al. | |
| 2002/0078128 A1* | 6/2002 | Peshkin | H04L 29/12009 |
| | | | 709/201 |
| 2002/0114469 A1 | 8/2002 | Faccin et al. | |
| 2003/0177236 A1 | 9/2003 | Goto et al. | |
| 2003/0204744 A1* | 10/2003 | Maltais | H04L 63/029 |
| | | | 726/5 |
| 2003/0217145 A1 | 11/2003 | Leung et al. | |
| 2004/0083306 A1 | 4/2004 | Gloe | |
| 2004/0088546 A1 | 5/2004 | Shah et al. | |
| 2004/0103184 A1 | 5/2004 | Humpleman et al. | |
| 2004/0221042 A1 | 11/2004 | Meier | |
| 2004/0224681 A1* | 11/2004 | Sjostrand | H04L 61/10 |
| | | | 455/433 |
| 2005/0036503 A1 | 2/2005 | Rangarajan et al. | |
| 2005/0243778 A1 | 11/2005 | Wang et al. | |
| 2006/0130136 A1 | 6/2006 | Devarapalli et al. | |
| 2006/0239254 A1 | 10/2006 | Short et al. | |
| 2006/0274749 A1 | 12/2006 | Beier | |
| 2006/0282879 A1 | 12/2006 | Johnson et al. | |
| 2007/0002833 A1 | 1/2007 | Bajic | |
| 2007/0061458 A1 | 3/2007 | Lum | |
| 2007/0088708 A1 | 4/2007 | Vijayarajan | |
| 2007/0091846 A1 | 4/2007 | Kim et al. | |
| 2007/0091850 A1 | 4/2007 | Lee et al. | |
| 2007/0173283 A1 | 7/2007 | Livet et al. | |
| 2007/0183367 A1 | 8/2007 | Park | |
| 2007/0213053 A1 | 9/2007 | Do | |
| 2007/0214232 A1 | 9/2007 | Belimpasakis et al. | |
| 2007/0268919 A1 | 11/2007 | Sarikaya et al. | |
| 2008/0037479 A1 | 2/2008 | Janneteau et al. | |
| 2008/0040787 A1 | 2/2008 | Aso et al. | |
| 2008/0046593 A1 | 2/2008 | Ando et al. | |
| 2008/0072301 A1 | 3/2008 | Chia et al. | |
| 2008/0176560 A1 | 7/2008 | Dutta et al. | |
| 2008/0280605 A1 | 11/2008 | Ophir et al. | |
| 2008/0310381 A1 | 12/2008 | Taaghol et al. | |
| 2009/0003297 A1 | 1/2009 | Xia et al. | |
| 2009/0013210 A1* | 1/2009 | McIntosh | H04L 41/0672 |
| | | | 714/4.1 |
| 2009/0040995 A1 | 2/2009 | Buddhikot et al. | |
| 2009/0070474 A1 | 3/2009 | Aura et al. | |
| 2009/0073937 A1 | 3/2009 | Xia et al. | |
| 2009/0158390 A1 | 6/2009 | Guan | |
| 2010/0075636 A1 | 3/2010 | Bajko et al. | |
| 2010/0215019 A1 | 8/2010 | Velev et al. | |
| 2010/0265846 A1 | 10/2010 | Weniger | |
| 2011/0026435 A1 | 2/2011 | Weniger et al. | |
| 2011/0284101 A1 | 11/2011 | Thurau et al. | |

FOREIGN PATENT DOCUMENTS

| | | |
|---|---|---|
| EP | 2056558 A1 | 5/2009 |
| EP | 2207391 A1 | 7/2010 |
| JP | 2008172842 A | 7/2008 |
| JP | 2011501626 A | 1/2011 |
| JP | 2012515309 A | 7/2012 |
| KR | 20070056162 A | 5/2007 |
| WO | 2009007107 A2 | 1/2009 |
| WO | 2009052609 A1 | 4/2009 |
| WO | 2009056209 A1 | 5/2009 |
| WO | 2009057296 A1 | 5/2009 |

OTHER PUBLICATIONS

Tsirtsis, G, et al., "Triggering AAA from DHCP Relay Agents"; draft-ietf-dhc-aaa-ra-OO.txt, IETF Standard-Working-Draft; Internet Engineering Task Force; IETF; CH; vol. dhc; Jan. 1, 2001, pp. 1-7.

\* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Code     |     Length    |        Local Domain Name ...
+-+-+-+-+-+-+-+-+-+-+-+-+-+-+-+-+-+-+-+-+-+-+-+-+-+-+-+-+-+-+-+-+
```

FIG. 4a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  OPTION_LOCAL_DOMAIN_NAME     |          option-length         |
+-+-+-+-+-+-+-+-+-+-+-+-+-+-+-+-+-+-+-+-+-+-+-+-+-+-+-+-+-+-+-+-+
|                    local-domain-name ...
+-+-+-+-+-+-+-+-+-+-+-+-+-+-+-+-+-+-+-+-+
```

FIG. 4b

METHOD, DEVICE AND SYSTEM FOR OBTAINING LOCAL DOMAIN NAME

CROSS-REFERENCE TO RELATED APPLICATIONS

This application is a continuation of U.S. patent application Ser. No. 15/428,335, filed on Feb. 9, 2017, which is a continuation of U.S. patent application Ser. No. 13/339,943, filed on Dec. 29, 2011, now U.S. Pat. No. 9,602,463. The U.S. patent application Ser. No. 13/339,943 is continuation of International Application No. PCT/CN2009/072618, filed on Jul. 3, 2009. All of the aforementioned patent applications are hereby incorporated by reference in their entireties.

TECHNICAL FIELD

The present invention relates to the field of communications, and in particular, to a method, device and system for obtaining a local domain name.

BACKGROUND

An Extensible Authentication Protocol (EAP) defines an authentication and key management architecture. An EAP authentication method is end-to-end authentication between an EAP client and an EAP server. An EAP packet can be borne by different protocols between different network entities on an authentication path. For example, an Authentication, Authorization and Accounting (AAA) protocol is adopted between an authenticator and the EAP server, which may be Diameter, Radius, or the like.

The EAP authentication is widely applied in network access control. As shown in FIG. 1 which is an EAP authentication model: An Extensible Authentication Protocol (EAP)-client, EAP client, also called a peer or a supplicant (all of these names can be used interchangeably), is a function entity of a user terminal, and is configured to respond to the EAP authentication initiated by an authenticator on a link and implement the authentication between the EAP client and an EAP server. The authenticator is generally located on a Network Access Server (NAS), and is configured to initiate an EAP authentication process on the link, so as to implement the authentication between the EAP client and the EAP server. During the authentication process, the authenticator forwards an EAP message and performs underlying protocol conversion. For example, an EAP packet of the EAP client borne by a layer 2/3 protocol is received, a packet header of the layer 2/3 protocol is removed, and then the EAP packet is encapsulated through the AAA protocol and is sent to the EAP server. The EAP server, also called a backend authentication server, an AAA server, or a re-authentication server (during re-authentication), or called a domain server for short, is configured to provide the authenticator with an authentication service, that is, authenticate the EAP client.

When a node leaves a home domain, after the node performs a complete EAP authentication with a home server, a shared key is set up by the home domain server for the node (the EAP client) and a local domain server. When the node performs re-authentication in a local domain, the node can use the key to perform authentication with the local domain server, in which the process for generating the key of the re-authentication is as follows.

The shared key of the local domain server and the EAP client is called a Domain Specific Root Key (DSRK). The calculation method of the key is DSRK=KDF (EMSK, Domain_ID|NULL|Peer_ID|Key_length), where "|" is a connecting symbol, for example, in A|B, if A represents a character string "good" and B represents "night", A|B represents "good night"; KDF represents a key derivation function, generally a unidirectional Hash function; EMSK is an extended master session key; Domain_ID is a local domain name; Peer_ID is a user identity; and Key_length is a key length. Since the local domain server does not have the master key EMSK for generating the DSRK (which is saved on the home EAP server and the EAP client), the local domain server needs to obtain the master key EMSK from the home EAP server. The process of obtaining the master key EMSK is classified into an implicit process and an explicit process. The implicit process is an implicit EAP Re-authentication Protocol (ERP) bootstrapping process, which is included in a full authentication process, in which the local domain server requests, from the home domain server, informations relevant to a key such as the DSRK. The explicit process is an explicit ERP bootstrapping process, which is initiated by the EAP client when the EAP client does not have a local domain name, in which the local domain server may also incidentally request, from the home domain server, the informations relevant to a key such as the DSRK.

When the node hands over from one authenticator to a new authenticator during movement, or re-acknowledgement of its accessing (re-authentication) is performed, the existing EAP architecture requires that the node perform a complete EAP process with the home domain authentication server. Generally, one complete EAP authentication process requires multiple rounds interaction of a EAP authentication message. Moreover, the distance from the current authenticator to the home authentication server is long, and multiple hops exist. Since the EAP client does not know the local domain name to which the client belongs, a full authentication process must be performed again. Therefore, the node needs to spend a long time performing the complete authentication once, when the node leaves the home domain. Network accessing authentication and key management during the handover are one of main factors causing a handover delay, and the handover delay caused by the re-authentication performed by the node is one of the biggest problems of the mobile network.

SUMMARY

Accordingly, main objects of the embodiments of the present invention are to provide a method, device and system for obtaining a local domain name, to solve the problem that a user is incapable of obtaining a local domain name after full authentication, so that a User Equipment (UE) can perform fast re-authentication during a handover, thereby reducing the handover delay and improving the user experience.

In order to achieve the above objectives, the present invention provides the following technical solutions.

An embodiment of the present invention provides a method for obtaining a local domain name, where the method includes: receiving a Dynamic Host Configuration Protocol (DHCP) request from a UE, in which the request carries an option for indicating returning a domain name of a local domain where the UE is located; and obtaining, according to the DHCP request, the domain name of the local domain where the UE is located, and carrying, in a DHCP reply message to be returned to the UE, the domain name of the local domain where the UE is located.

An embodiment of the present invention provides another method for obtaining a local domain name, where the method includes: sending a DHCP request to a first server, in which the request carries an option for indicating returning a domain name of a local domain where a UE is located; and receiving a DHCP reply message returned by the first server, and obtaining, from the reply message, the domain name of the local domain where the UE is located.

An embodiment of the present invention provides a device for obtaining a local domain name, where the device includes: a first receiving unit, configured to receive a DHCP request from a UE, in which the request carries an option for indicating returning a domain name of a local domain where the UE is located; an obtaining unit, configured to obtain, according to the DHCP request, the domain name of the local domain where the UE is located; and a first sending unit, configured to carry, in a DHCP reply message to be returned to the UE, the domain name, obtained by the obtaining unit, of the local domain where the UE is located.

An embodiment of the present invention provides another device for obtaining a local domain name, where the device includes: a second sending unit, configured to send a DHCP request to a first server, in which the request carries an option for indicating returning a domain name of a local domain where a UE is located; and a second receiving unit, configured to receive a DHCP reply message returned by the first server, and obtain, from the reply message, the domain name of the local domain where the UE is located.

An embodiment of the present invention provides a system for obtaining a local domain name, where the system includes: a UE, configured to send a DHCP request to a first server, in which the request carries an option for indicating returning a domain name of a local domain where the UE is located; and receive a DHCP reply message returned by the first server, and obtain, from the reply message, the domain name of the local domain where the UE is located; and a first server, configured to receive the DHCP request from the UE; and obtain, according to the DHCP request, the domain name of the local domain where the UE is located, and carry, in the DHCP reply message to be returned to the UE, the domain name of the local domain where the UE is located.

It can be seen from the specific implementation solutions according to the embodiments of the present invention that, the UE sends the DHCP request to the first server, in which the request carries the option for indicating returning the domain name of the local domain where the UE is located; and the first server, according to the DHCP request, carries, in the DHCP reply message to be returned to the UE, the domain name of the local domain where the UE is located, which solves the problem that a user is incapable of obtaining a local domain name after full authentication, so that the UE can perform fast re-authentication during a handover, thereby reducing a handover delay and improving the user experience.

BRIEF DESCRIPTION OF THE DRAWINGS

FIG. 4a is a schematic structural view of a local domain name option in a DHCP Version 4 (DHCPv4) message according to an embodiment of the present invention;

FIG. 4b is a schematic structural view of a local domain name option in a DHCP Version 6 (DHCPv6) message according to an embodiment of the present invention;

DETAILED DESCRIPTION OF ILLUSTRATIVE EMBODIMENTS

In order to the make the objectives, technical solutions, and advantages of the present invention more comprehensible, embodiments of the present invention are further described in detail in the following with reference to the accompanying drawings.

Apparently, the embodiments to be described are only a part rather than all of the embodiments of the present invention. Persons of ordinary skill in the art can derive other embodiments based on the embodiments of the present invention without creative efforts, which all fall within the scope of the present invention.

Figure 1:
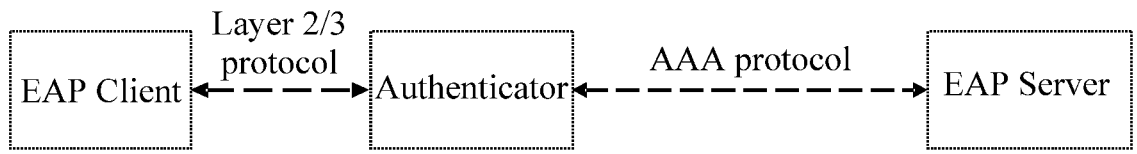
FIG. 1 shows an EAP authentication model in the prior art.
Figure 2:
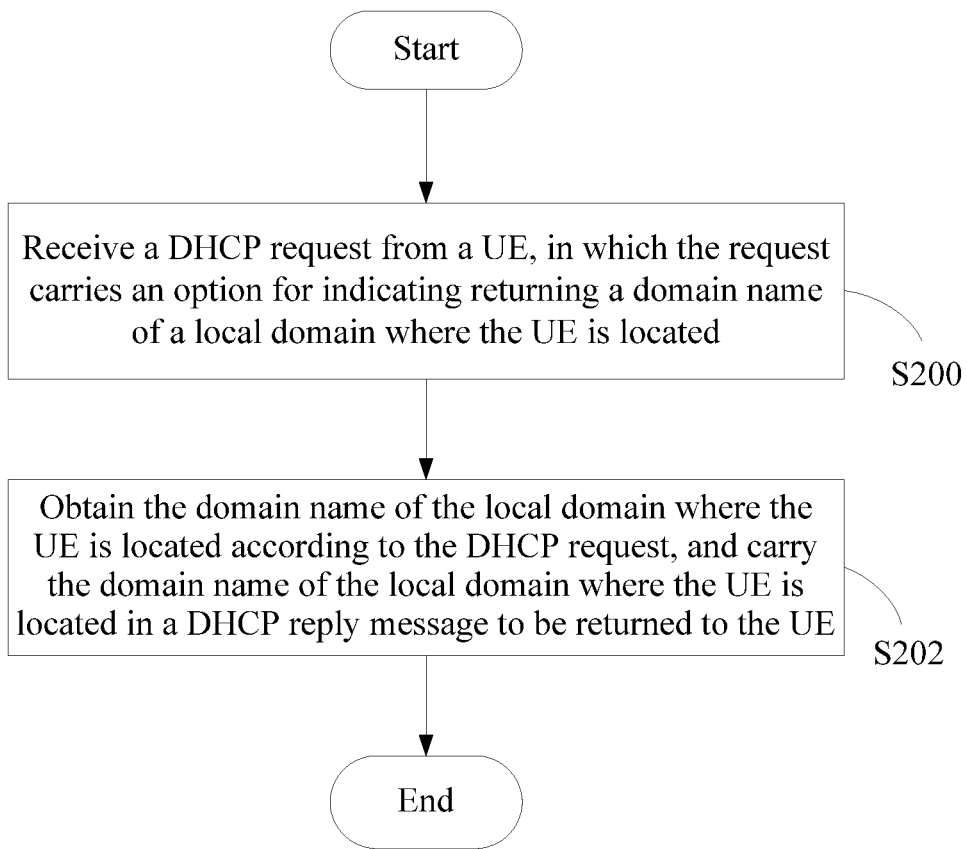
FIG. 2 is a flow chart of a method for obtaining a local domain name according to an embodiment of the present invention.

FIG. 2 is a flow chart of a method for obtaining a local domain name according to an embodiment of the present invention. The method includes:

Step S200: A DHCP request of a UE is received, in which the request carries an option for indicating returning a domain name of a local domain where the UE is located.

The UE may be a user, a user terminal, an ERP client, a DHCP client, a peer, a supplicant, or the like, all of which have the same physical meaning in this solution.

The domain name of the local domain where the UE is located, called a local domain name for short, is a name of a domain where a current network to which the UE is attached is located. The current network mainly refers to a visited network, and may also be a home network.

Step S202: The domain name of the local domain where the UE is located is obtained according to the DHCP request, and the domain name of the local domain where the UE is located is carried in a DHCP reply message to be returned to the UE.

The obtaining the domain name of the local domain where the UE is located is specifically as follows.

The domain name of the local domain where the UE is located is obtained from a first server itself; or after a second server receives the DHCP request and inserts the domain name of the local domain where the UE is located into the DHCP request, the domain name of the local domain where the UE is located is obtained from the DHCP request, into which the domain name of the local domain where the UE is located is inserted and which is forwarded by the second server, in which the domain name of the local domain where the UE is located is obtained by the second server from a third server.

The first server may be a DHCP server, in which the DHCP server is preferably located in a local network, and may also be located in a home network. The second server may be a NAS which is used as a relay or an agent of the DHCP server, and may also be a DHCP relay or a DHCP agent, or may implement a relay or agent function of the DHCP server through an internal module interface between an authenticator and a DHCP relay/agent. The second server and the first server may be separated or coexist physically. The third server is a local EAP server, a home EAP server, an AAA server with an EAP function, or an AAA server with an ERP function.

The carrying, in the DHCP reply message to be returned to the UE, the domain name of the local domain where the UE is located specifically includes: setting the domain name of the local domain where the UE is located in a local domain name option, and encapsulating the local domain name option in the DHCP reply message to be sent to the UE.

It can be seen from the specific implementation solution according to the embodiment of the present invention that, the DHCP request of the UE is received, in which the request carries the option for indicating returning the domain name of the local domain where the UE is located; and the domain name of the local domain where the UE is located is obtained according to the DHCP request, and the domain name of the local domain where the UE is located is carried in the DHCP reply message to be returned to the UE, which solves the problem that a user is incapable of obtaining a local domain name after full authentication, so that the UE can perform fast re-authentication during a handover, thereby reducing a handover delay and improving the user experience.

Figure 3:
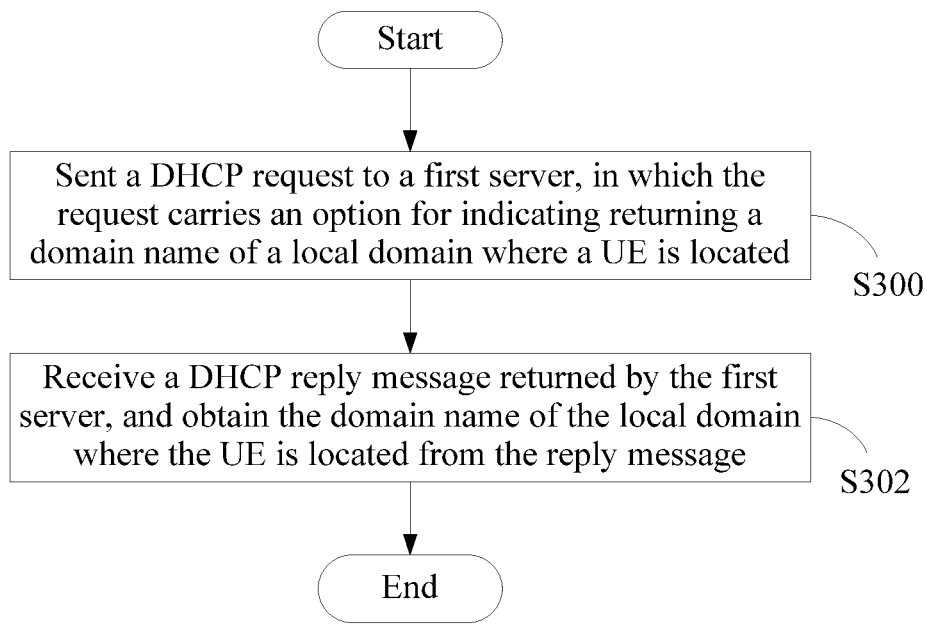
FIG. 3 is a flow chart of another method for obtaining a local domain name according to an embodiment of the present invention.

FIG. 3 is a flow chart of another method for obtaining a local domain name according to an embodiment of the present invention.

Step S300: A DHCP request is sent to a first server, in which the request carries an option for indicating returning a domain name of a local domain where a UE is located.

The sending the DHCP request to the first server specifically includes the following step.

The DHCP request is directly sent to the first server; or the DHCP request is sent to a second server, and after the second server receives the DHCP request and inserts the domain name of the local domain where the UE is located into the DHCP request, the DHCP request is forwarded to the first server through the second server, in which the domain name of the local domain where the UE is located is obtained by the second server from a third server.

The domain name of the local domain where the UE is located, called a local domain name for short, is a name of a domain where a current network to which the UE is attached is located. The current network mainly refers to a visited network, and may also be a home network.

Step S302: A DHCP reply message returned by the first server is received, and the domain name of the local domain where the UE is located is obtained from the reply message.

The sending the DHCP request to the first server specifically includes: sending, by the second server, the DHCP request to the first server, in which the first server and the second server are integrated on one server or disposed separately.

The UE may be a user, a user terminal, an ERP client, a DHCP client, a peer, a supplicant, or the like, all of which have the same physical meaning in this solution.

The first server may be a DHCP server, in which the DHCP server is preferably located in a local network, and may also be located in a home network. The second server may be a NAS which is used as a relay or an agent of the DHCP server, and may also be a DHCP relay or a DHCP agent, or may implement a relay or agent function of the DHCP server through an internal module interface between an authenticator and a DHCP relay/agent, and may also be a server with an authenticator function and a DHCP relay/agent function. The second server and the first server may be separated or coexist physically.

It can be seen from the specific implementation solution according to the embodiment of the present invention that, the DHCP request is sent to the first server, in which the request carries the option for indicating returning the domain name of the local domain where the UE is located; and the DHCP reply message returned by the first server is received, and the domain name of the local domain where the UE is located is obtained from the reply message, which solves the problem that a user is incapable of obtaining a local domain name after full authentication, so that the UE can perform fast re-authentication during a handover, thereby reducing a handover delay and improving the user experience.

Figure 4:
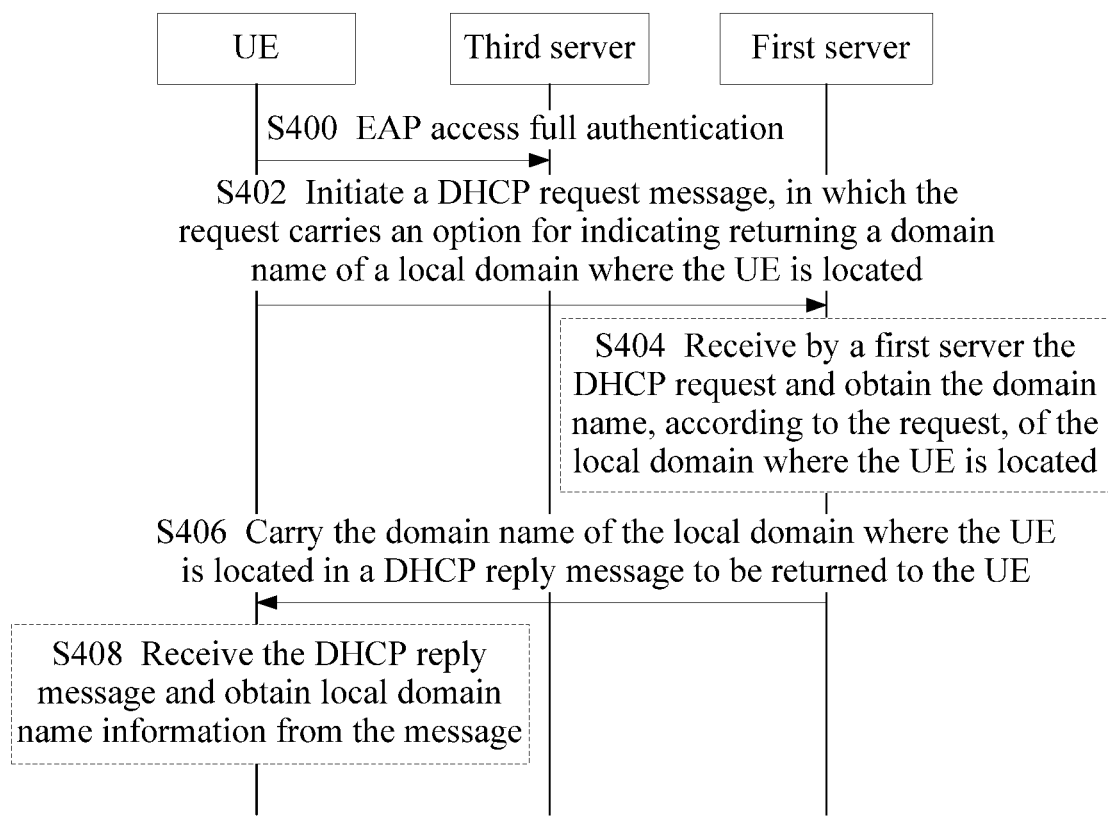
FIG. 4 is a flow chart of a specific implementation for obtaining a local domain name according to an embodiment of the present invention.

FIG. 4 is a flow chart of a specific implementation for obtaining a local domain name according to an embodiment of the present invention.

Step S400: After accessing a network, a UE performs EAP full authentication.

The UE may be a user, a user terminal, an ERP client, a DHCP client, a peer, a supplicant, or the like, all of which have the same physical meaning in this solution.

Specifically, the UE performs EAP access full authentication with a third server, and after the authentication succeeds, the following steps are performed. The third server is a local EAP server, a home EAP server, an AAA server with an EAP function, or an AAA server with an ERP function.

Step S402: The UE initiates a DHCP request message, in which the request carries an option for indicating returning a domain name of a local domain where the UE is located.

The domain name of the local domain where the UE is located, called a local domain name for short, is a name of a domain where a current network to which the UE is attached is located. The current network mainly refers to a visited network, and may also be a home network.

The DHCP request message may be a DHCP DISCOVERY message or a DHCP REQUEST message of DHCPv4, or a DHCP Solicit message, a DHCP Request message, or a DHCP Information Request message of DHCPv6. Option information for requesting the local domain name is carried in the request message. For the DHCPv4, a code of a local domain name option is carried in a Parameter Request List; and for the DHCPv6, the code of the local domain name option is carried in an Option Request Option.

Specifically, for schematic structural views of the option for indicating information of returning the domain name of the local domain where the UE is located in the DHCP request message, reference can be made to FIGS. 4a and 4b.

FIG. 4a is a schematic structural view of a local domain name option in a DHCPv4 message, in which the option is used for indicating or bearing the information of returning the domain name of the local domain where the UE is located. Code represents a serial number of the option for distinguishing the option from other options. For example, when Code is "100", the option represents a local domain name option (a specified value may also be defined as a value of Code); when the value of Code is "101" (a specified value may also be defined as the value of Code), the option may also represent a sub-option of a relay-agent-information option, in which the sub-option is used for a DHCP relay/agent to insert local domain name information. Length represents a length of the option.

Local Domain Name is used for indicating the domain name of the local domain where the UE is located, an encoding format of which is the same as that of a common domain name, for example, www.example.com.

FIG. 4b is a schematic structural view of a local domain name option in a DHCPv6 message (a DHCPv6 local domain name option).

"OPTION_LOCAL_DOMAIN_NAME" represents a code value of the DHCPv6 local domain name option. For example, if "OPTION_LOCAL_DOMAIN_NAME" is "103", the option represents a local domain name option (a specified value may also be defined as the code value).

Length represents a length of the option.

Local Domain Name is used for indicating the domain name of the local domain where the UE is located, an encoding format of which is the same as that of a common domain name.

The option in the message is extended to carry the domain name of the local domain where the UE is located, which omits the process for the UE to perform authentication again after the EAP full authentication, so that the UE can perform fast re-authentication, thereby reducing a handover delay.

Step S404: A first server receives the DHCP request, and obtains, according to the request, the domain name of the local domain where the UE is located.

Step S406: The domain name of the local domain where the UE is located is carried in a DHCP reply message to be returned to the UE.

Specifically, the first server, for example, a DHCP server, sets the local domain name in a local domain name option according to the DHCP request, and then carries the local domain name option in the DHCP reply message to be sent to the UE.

The reply message may be a DHCP DISOFFER message or a DHCP ACK message of the DHCPv4, or a DHCP Advertise message, a DHCP Reply message, or a DHCP Information Reply message of the DHCPv6.

The first server may be located in a local network or a home network.

Step S408: The UE receives the DHCP reply message and obtains the local domain name from the message.

It can be seen from the specific implementation solution according to the embodiment of the present invention that, after the EAP full authentication performed by the UE succeeds, the UE initiates a DHCP request, in which the request carries information for indicating returning the domain name of the local domain where the UE is located, and the first server receives the DHCP request and carries the domain name of the local domain where the UE is located in the DHCP reply message to be returned to the UE, which solves the problem that a user is incapable of obtaining a local domain name after full authentication, so that the UE can perform fast re-authentication during a handover, thereby reducing a handover delay and improving the user experience.

Figure 5:
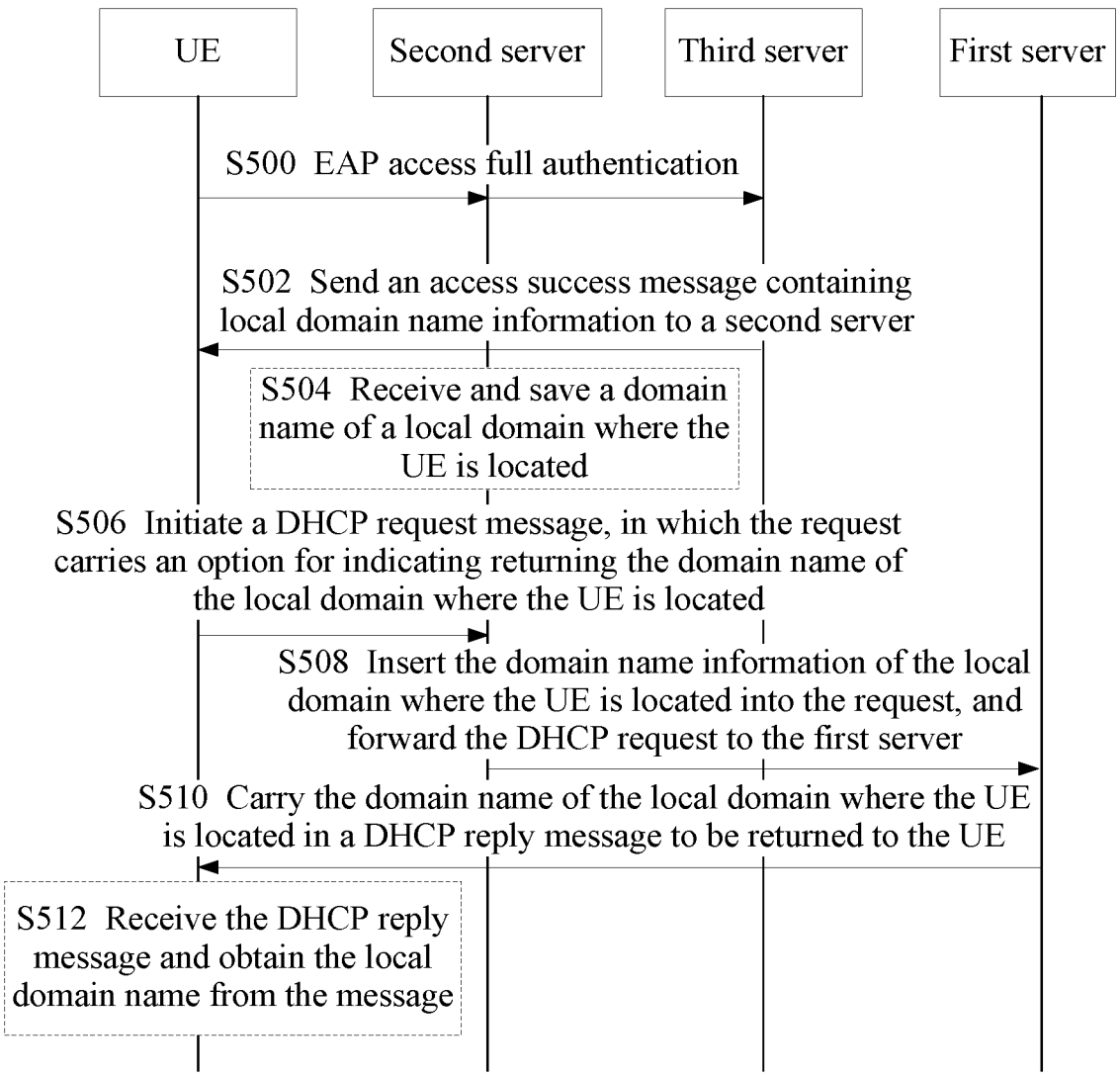
FIG. 5 is a flow chart of another specific implementation for obtaining a local domain name according to an embodiment of the present invention.

FIG. 5 is a flow chart of another specific implementation for obtaining a local domain name according to an embodiment of the present invention.

Step S500: After accessing a network, a UE performs EAP full authentication.

The UE may be a user, a user terminal, an ERP client, a DHCP client, a peer, a supplicant, or the like, all of which have the same physical meaning in this solution.

Specifically, the UE performs EAP access full authentication with a third server, and after the authentication succeeds, the following steps are performed.

Step S502: The third server sends an access success message containing local domain name information to a second server.

Specifically, the UE performs EAP access full authentication with a third server, and after the authentication succeeds, the following steps are performed. The third server is a local EAP server, a home EAP server, an AAA server with an EAP function, or an AAA server with an ERP function. The second server may be a NAS which is used as a relay or an agent of a DHCP server, or may implement a relay or agent function of the DHCP server through an internal module interface between an authenticator and a DHCP relay/agent, and may also be a server with an authenticator function and a DHCP relay/agent function. The second server and the first server may be separated or coexist physically.

Step S504: The second server receives and saves a domain name of a local domain where the UE is located.

Step S506: The UE initiates a DHCP request message, in which the request carries an option for indicating returning the domain name of the local domain where the UE is located.

The DHCP request message may be a DHCP DISCOVERY message or a DHCP REQUEST message of the DHCPv4, or a DHCP Solicit message, a DHCP Request message, or a DHCP Information Request message of the DHCPv6. Option information for requesting the local domain name is carried in the request message. For the DHCPv4, a code of the local domain name option is carried in a Parameter Request List; and for the DHCPv6, the code of the local domain name option is carried in an Option Request Option.

Specifically, for schematic structural views of the option for indicating information of returning the domain name of the local domain where the UE is located in the DHCP request message, reference can be made to FIGS. 4a and 4b. The schematic structural views of the option have been described in detail in the description of FIG. 4 and will not be described herein again.

Step S508: The second server receives the DHCP request, inserts the domain name of the local domain where the UE is located into the request, and forwards the DHCP request to the first server.

Step S510: The first server obtains local domain name information of the network node from the request according to the received DHCP request, and carries the domain name of the local domain where the UE is located in a DHCP reply message to be returned to the UE.

In step S508, the second server may also not insert the domain name of the local domain where the UE is located into the DHCP request when forwarding the DHCP request; and in step S510, when the DHCP server sends the DHCP reply message, the second server forwards the DHCP reply message, inserts the obtained domain name of the local domain where the UE is located into the reply message, and sends the domain name to the UE through the DHCP reply message.

Step S512: The UE receives the DHCP reply message and obtains the local domain name from the message.

It can be seen from the specific implementation solution according to the embodiment of the present invention that, after the EAP full authentication performed by the UE succeeds, the second server obtains the domain name of the local domain where the UE is located from the third server and stores the domain name of the local domain where the UE is located; when the UE initiates the DHCP request, the second server inserts the local domain name information into the DHCP request message to be sent to the first server; after receiving the DHCP request message, the first server obtains the local domain name information and carries, in the DHCP replay message to be sent to the UE, the local domain name information, which solves the problem that a user is incapable of obtaining a local domain name after full authentication, so that the UE can perform fast re-authentication during a handover, thereby reducing a handover delay and improving the user experience.

Figure 6:
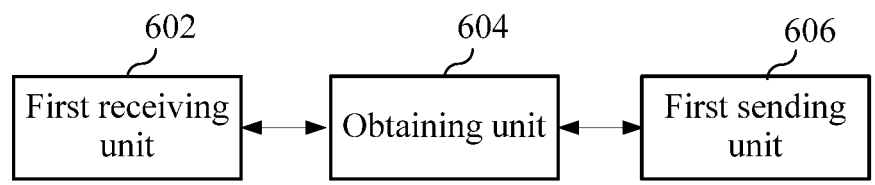
FIG. 6 is a schematic structural view of a device for obtaining a local domain name according to an embodiment of the present invention.

FIG. 6 is a schematic structural view of a device for obtaining a local domain name according to an embodiment of the present invention.

The device for obtaining a local domain name includes a first receiving unit 600, an obtaining unit 602, and a first sending unit 604.

The first receiving unit 600 is configured to receive a DHCP request of a UE, in which the request carries an option for indicating returning a domain name of a local domain where the UE is located.

The obtaining unit 602 is configured to obtain, according to the DHCP request, the domain name of the local domain where the UE is located.

The first sending unit 604 is configured to carry, in a DHCP reply message to be returned to the UE, the domain name, obtained by the obtaining unit, of the local domain where the UE is located.

The obtaining unit 602 is specifically configured to obtain the domain name of the local domain where the UE is located from the device itself; or after a second server receives the DHCP request and inserts the domain name of the local domain where the UE is located into the DHCP request, obtain the domain name of the local domain where the UE is located from the DHCP request, into which the domain name of the local domain where the UE is located is inserted and which is forwarded by the second server, in which the domain name of the local domain where the UE is located is obtained by the second server from a third server.

The domain name of the local domain where the UE is located, called a local domain name for short, is a name of a domain where a current network to which the UE is attached is located. The current network mainly refers to a visited network, and may also be a home network.

The UE may be a user, a user terminal, an ERP client, a DHCP client, a peer, a supplicant, or the like, all of which have the same physical meaning in this solution.

The first server may be a DHCP server, in which the DHCP server is preferably located in a local network, and may also be located in a home network. The second server may be a NAS which is used as a relay or an agent of the DHCP server, and may also be a DHCP relay or a DHCP agent, or may implement a relay or agent function of the DHCP server through an internal module interface between an authenticator and a DHCP relay/agent. The second server and the first server may be separated or coexist physically. The third server is a local EAP server, a home EAP server, an AAA server with an EAP function, or an AAA server with an ERP function.

The DHCP request message may be a DHCP DISCOVERY message or a DHCP REQUEST message of the DHCPv4, or a DHCP Solicit message, a DHCP Request message, or a DHCP Information Request message of the DHCPv6. Option information for requesting the local domain name is carried in the request message. For the DHCPv4, a code of a local domain name option is carried in a Parameter Request List; and for DHCPv6, the code of the local domain name option is carried in an Option Request Option.

Specifically, for schematic structural views of the option for indicating information of returning the domain name of the local domain where the UE is located in the DHCP request message, reference can be made to the description of FIGS. 4a and 4b, and the details will not be described herein again.

It can be seen from the specific implementation solution according to the embodiment of the present invention that, after EAP full authentication is implemented, the first receiving unit receives the DHCP request of the UE, in which the request carries information for indicating returning the domain name of the local domain where the UE is located; the obtaining unit obtains the domain name of the local domain where the UE is located according to the DHCP request; and the first sending unit carries the domain name, obtained by the obtaining unit, of the local domain where the UE is located in the DHCP reply message to be returned to the UE, which solves the problem that a user is incapable of obtaining a local domain name after full authentication, so that the UE can perform fast re-authentication during a handover, thereby reducing a handover delay and improving the user experience.

Figure 7:
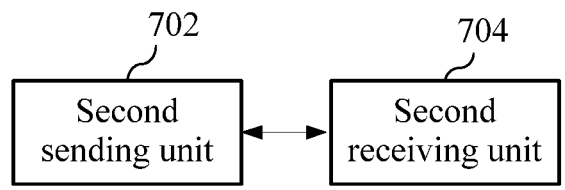
FIG. 7 is a schematic structural view of another device for obtaining a local domain name according to an embodiment of the present invention.

FIG. 7 is a schematic structural view of another device for obtaining a local domain name according to an embodiment of the present invention.

The device for obtaining a local domain name includes a second sending unit 702 and a second receiving unit 704.

The second sending unit 702 is configured to send a DHCP request to a first server, in which the request carries an option for indicating returning a domain name of a local domain where a UE is located.

The second receiving unit 704 is configured to receive a DHCP reply message returned by the first server, and obtain, from the reply message, the domain name of the local domain where the UE is located.

The second sending unit is specifically configured to directly send the DHCP request to the first server; or send the DHCP request to a second server, and after the second server receives the DHCP request and inserts the domain name of the local domain where the UE is located into the DHCP request, forward the DHCP request to the first server through the second server, in which the domain name of the local domain where the UE is located is obtained by the second server from a third server. The first server may be a DHCP server, in which the DHCP server is preferably located in a local network, and may also be located in a home network. The second server may be a NAS which is used as a relay or an agent of the DHCP server, and may also be a DHCP relay or a DHCP agent, or may implement a relay or agent function of the DHCP server through an internal module interface between an authenticator and a DHCP relay/agent. The second server and the first server may be separated or coexist physically.

The domain name of the local domain where the UE is located, called a local domain name for short, is a name of a domain where a current network to which the UE is attached is located. The current network mainly refers to a visited network, and may also be a home network.

The device may be a DHCP server, in which the DHCP request message may be a DHCP DISCOVERY message or a DHCP REQUEST message of the DHCPv4, or a DHCP Solicit message, a DHCP Request message, or a DHCP Information Request message of the DHCPv6. Option information for requesting the local domain name is carried in the request message. For the DHCPv4, a code of a local domain name option is carried in a Parameter Request List; and for the DHCPv6, the code of the local domain name option is carried in an Option Request Option.

Specifically, for schematic structural views of the option for indicating information of returning the domain name of the local domain where the UE is located in the DHCP request message, reference can be made to FIGS. 4a and 4b.

It can be seen from the specific implementation solution according to the embodiment of the present invention that, after EAP full authentication is implemented, the second sending unit sends the DHCP request to the first server, in which the request carries information for indicating returning the domain name of the local domain where the UE is located; and the second receiving unit receives the DHCP reply message returned by the first server, and obtains, from the reply message, the domain name of the local domain where the UE is located, which solves the problem that a user is incapable of obtaining a local domain name after full authentication, so that the UE can perform fast re-authentication during a handover, thereby reducing a handover delay and improving the user experience.

Figure 8:
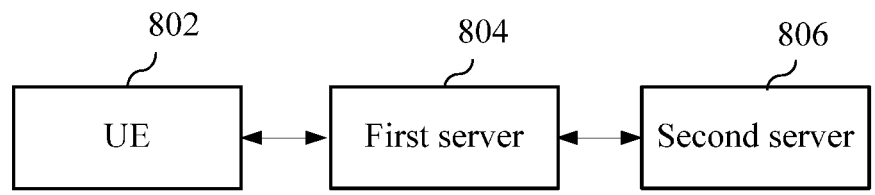
FIG. 8 is a schematic structural view of a system for obtaining a local domain name according to an embodiment of the present invention.

FIG. 8 is a schematic structural view of a system for obtaining a local domain name according to an embodiment of the present invention.

The system for obtaining a local domain name includes a UE 802 and a first server 804.

The UE 802 is configured to send a DHCP request to the first server after implementing EAP full authentication, in which the request carries an option for indicating returning a domain name of a local domain where the UE is located; and receive a DHCP reply message returned by the first server, and obtain the domain name of the local domain where the UE is located from the reply message.

The first server 804 is configured to receive the DHCP request of the UE after the EAP full authentication is implemented; and obtain the domain name of the local domain where the UE is located according to the DHCP request, and carry, in the DHCP reply message to be returned to the UE, the domain name of the local domain where the UE is located.

The system also includes a second server.

The second server 806 is configured to obtain, from a third server, the domain name of the local domain where the UE is located, and store the domain name of the local domain where the UE is located; and after receiving the DHCP request and inserting the domain name of the local domain where the UE is located into the DHCP request, forward the DHCP request to the first server.

The first server 804 is specifically configured to obtain, from the DHCP request forwarded by the second server, the domain name of the local domain where the UE is located, or obtain the domain name of the local domain where the UE is located from the first server itself.

The UE may be a user, a user terminal, an ERP client, a DHCP client, a peer, a supplicant, or the like, all of which have the same physical meaning in this solution.

The domain name of the local domain where the UE is located, called a local domain name for short, is a name of a domain where a current network to which the UE is attached is located. The current network mainly refers to a visited network, and may also be a home network.

The first server may be a DHCP server, in which the DHCP server is preferably located in a local network, and may also be located in a home network. The second server may be a NAS, which is used as a relay or an agent of the DHCP server, and may also be a DHCP relay or a DHCP agent, or may implement a relay or agent function of the DHCP server through an internal module interface between an authenticator and a DHCP relay/agent, and may also be a server with an authenticator function and a DHCP relay/agent function. The second server and the first server may be separated or coexist physically. The third server is a local EAP server, a home EAP server, an AAA server with an EAP function, or an AAA server with an ERP function.

Through the system for obtaining a local domain name according to the embodiment of the present invention and interaction between each UE and the first server in the system, the problem that a user is incapable of obtaining a local domain name after full authentication is solved, so that the UE can perform fast re-authentication during a handover, thereby reducing a handover delay and improving the user experience.

Although the present invention is described above with some exemplary embodiments, the scope of the present invention is not limited thereto. Variations or replacements that can be easily thought of by persons skilled in the art within the technical scope of the present invention should be considered falling within the protection scope of the present invention. Therefore, the protection scope of the invention falls in the appended claims.

What is claimed is:

1. A method, comprising:
    receiving, by a device, a Dynamic Host Configuration Protocol (DHCP) request message associated with a user device, the DHCP request message being addressed to a DHCP server, wherein the DHCP request message comprises information indicating a request for a domain name of a domain of a visited network where the user device is currently located;
    adding, by the device, the domain name of the domain of the visited network to the DHCP request message to obtain an updated DHCP request message; and
    sending, by the device, the updated DHCP request message with the domain name of the domain of the visited network to the DHCP server.

2. The method of claim 1, wherein the device is a DHCP relay server.

3. The method of claim 1, wherein the DHCP request message does not include the domain name of the domain of the visited network.

4. The method of claim 1, wherein the user device is unaware of the domain name of the domain of the visited network when the DHCP request message associated with the user device is received.

5. A method, comprising:
    receiving, by a device, a Dynamic Host Configuration Protocol (DHCP) request message, wherein the DHCP request message includes information indicating sending, to User Equipment (UE), a domain name of a domain of a visited network where the UE is currently located, and the DHCP request message is sent by the UE after the UE performs Extensible Authentication Protocol (EAP) access full authentication; and
    in response to receiving the DHCP request message, sending, by the device, a DHCP reply message to the UE, wherein the DHCP reply message includes the domain name of the domain of the visited network where the UE is currently located, and the UE uses the domain name of the domain of the visited network to perform fast re-authentication during a handover process of the UE.

6. The method of claim 5, wherein the DHCP request message includes the domain name of the domain of the visited network where the UE is currently located.

7. The method of claim 5, wherein DHCP request message does not include the domain name of the domain of the visited network where the UE is currently located.

8. The method of claim 5, wherein the device is a DHCP server.

9. A network device, comprising:
a processor; and
a non-transitory memory coupled to the processor and storing computer-executable instructions, wherein the processor is configured to execute the computer-executable instructions to:
receive a Dynamic Host Configuration Protocol (DHCP) request message associated with a user device, the DHCP request message being addressed to a DHCP server, wherein the DHCP request message comprises information indicating a request for a domain name of a domain of a visited network where the user device is currently located;
add the domain name of the domain of the visited network where the user device is currently located to the DHCP request message to obtain an updated DHCP request message; and
send the updated DHCP request message with the domain name of the domain of the visited network to the DHCP server.

10. The network device of claim 9, wherein the network device is a DHCP relay server.

11. The network device of claim 9, wherein the DHCP request message does not include the domain name of the domain of the visited network.

12. A network device, comprising:
a receiver configured to receive a Dynamic Host Configuration Protocol (DHCP) request message associated with a user device, the DHCP request message being addressed to a DHCP server, wherein the DHCP request message comprises information indicating a request for a domain name of a domain of a visited network where the user device is currently located;
a processor;
a computer-readable storage medium storing a program to be executed by the processor, the program including instructions for:
adding the domain name of the domain of the visited network to the DHCP request message to obtain an updated DHCP request message; and
a transmitter configured to transmit the updated DHCP request message with the domain name of the domain of the visited network to the DHCP server.

13. The network device of claim 12, wherein the network device is a DHCP relay server.

14. The network device of claim 12, wherein the DHCP request message does not include the domain name of the domain of the visited network.

15. A device, comprising:
a processor; and
a non-transitory memory coupled to the processor and storing computer-executable instructions, wherein the processor is configured to execute the computer-executable instructions to:
receive a Dynamic Host Configuration Protocol (DHCP) request message, wherein the DHCP request message includes information indicating sending, to User Equipment (UE), a domain name of a visited domain where the UE is currently located, and the DHCP request message is sent by the UE after the UE performs Extensible Authentication Protocol (EAP) access full authentication; and
send, responsive to the DHCP request, a DHCP reply message to the UE, wherein the DHCP reply message includes the domain name of the visited domain where the UE is currently located, and the UE uses the domain name of the visited domain to perform fast re-authentication during a handover process of the UE.

16. The device of claim 15, wherein the device is a DHCP server.

* * * * *